United States Patent
Li et al.

(10) Patent No.: US 8,376,611 B2
(45) Date of Patent: Feb. 19, 2013

(54) CIRCUITS AND METHODS FOR TEMPERATURE DETECTION

(75) Inventors: Guoxing Li, Sunnyvale, CA (US); Xiaohu Tang, Shanghai (CN)

(73) Assignee: O2Micro International Limited, Grand Cayman (KY)

( * ) Notice: Subject to any disclaimer, the term of this patent is extended or adjusted under 35 U.S.C. 154(b) by 451 days.

(21) Appl. No.: 12/751,432

(22) Filed: Mar. 31, 2010

(65) Prior Publication Data

US 2010/0259313 A1 Oct. 14, 2010

Related U.S. Application Data

(60) Provisional application No. 61/169,015, filed on Apr. 14, 2009.

(51) Int. Cl.
*G01K 7/01* (2006.01)
(52) U.S. Cl. .......... 374/178; 374/163; 327/513
(58) Field of Classification Search .......... 374/163, 374/178; 327/513
See application file for complete search history.

(56) References Cited

U.S. PATENT DOCUMENTS

| | | | | | |
|---|---|---|---|---|---|
| 4,302,731 | A | * | 11/1981 | Ashida | 331/116 R |
| 4,316,080 | A | * | 2/1982 | Wroblewski | 219/505 |
| 4,454,483 | A | * | 6/1984 | Baylor | 331/11 |
| 5,546,041 | A | * | 8/1996 | Szajda | 327/512 |
| 7,248,099 | B2 | * | 7/2007 | Kedilaya et al. | 327/539 |
| 7,252,432 | B1 | * | 8/2007 | Henderson et al. | 374/183 |
| 7,309,157 | B1 | * | 12/2007 | Aslan et al. | 374/178 |
| 7,331,708 | B2 | * | 2/2008 | Blom et al. | 374/171 |
| 7,400,208 | B2 | * | 7/2008 | Yoshikawa | 331/176 |
| 7,598,722 | B1 | * | 10/2009 | Falik | 324/71.5 |
| 7,724,068 | B1 | * | 5/2010 | Smith et al. | 327/513 |
| 7,798,707 | B2 | * | 9/2010 | Schnaitter | 374/178 |
| 2010/0289553 | A1 | * | 11/2010 | Wang | 327/512 |

* cited by examiner

*Primary Examiner* — Christopher Fulton

(57) ABSTRACT

A temperature detection circuit includes a sensor, an integrated circuit (IC) chip, and a resistor. The sensor is operable for sensing a temperature. The IC chip can compare a sense voltage indicative of the temperature with a threshold voltage indicative of a temperature threshold to determine a temperature condition. The IC chip has a substantially constant parameter. The resistor is externally coupled to the IC chip. The IC chip maintains a current ratio, including a ratio of a first current flowing through the sensor to a second current flowing through the resistor, equal to the substantially constant parameter.

28 Claims, 11 Drawing Sheets

CIRCUITS AND METHODS FOR TEMPERATURE DETECTION

RELATED APPLICATION

This application claims priority to U.S. Provisional Application No. 61/169,015, titled "Circuits and Methods for Temperature Protection", filed on Apr. 14, 2009, which is hereby incorporated by reference in its entirety.

BACKGROUND

Energy storage elements, such as batteries, may deteriorate under over-temperature conditions. FIG. 1 illustrates a schematic diagram of a conventional over-temperature detection circuit 100. The conventional over-temperature detection circuit 100 includes an integrated circuit (IC) chip 110 and a negative temperature coefficient (NTC) thermistor 130 externally coupled to the chip 110 via a dedicated analog NTC pin. The chip 110 can include a comparator 120 and multiple internal resistors, e.g., a resistor 112, a resistor 114, a resistor 116 and a resistor 118. For example, the internal resistors are integrated onto the IC chip 110. The thermistor 130 can sense temperature of, e.g., a battery pack, and can vary resistance of the thermistor 130 when the temperature changes. A voltage divider constituted by the resistor 118, the resistor 112 and the thermistor 130 provides a temperature sense voltage at node 122. Another voltage divider constituted by the resistor 118, the resistor 114 and the resistor 116 provides a reference threshold voltage indicative of a temperature threshold at node 124. The comparator 120 compares the temperature sense voltage to the reference threshold voltage, and generates an over-temperature detection signal OTA if the temperature sense voltage drops below the reference threshold voltage. Thus, when the temperature reaches the temperature threshold, the resistance of the thermistor 130 depends on the resistance of internal resistors, e.g., the resistors 112, 114, 116.

The internal resistors can be fabricated by a doped region on a silicon chip. Therefore, resistance of the internal resistors varies in different chips or different doped regions of the same chip, which may affect the accuracy of the temperature detection circuit 100. In addition, resistance of the resistor 118 may be set relatively high to reduce the current consumption, which may increase the chip size and the cost of the over-temperature detection circuit 100.

FIG. 2 illustrates a schematic diagram of another conventional over-temperature detection circuit 200. Elements labeled the same as in FIG. 1 have similar functions. The over-temperature detection circuit 200 includes an external adjustable resistor 210 coupled to the thermistor 130 and to the IC chip 110 for adjusting errors caused by the resistance variation of the internal resistors. However, chip size remains an issue.

FIG. 3 illustrates a schematic diagram of another conventional over-temperature detection circuit 300. Elements labeled the same as in FIG. 1 and FIG. 2 have similar functions. The over-temperature detection circuit 300 includes an external resistor 312 in series with the thermistor 130. As such, a temperature sense voltage at node 302 can be provided by a voltage divider including the external resistor 312 and the thermistor 130, and a reference threshold voltage at node 304 can be provided by a voltage divider including resistors 116 and 114. However, a leakage current can flow through the resistor 312 and the thermistor 130 even when the IC chip 310 is powered off, which may increase power consumption.

Resistance of the resistors involved in the conventional over-temperature detection circuits 100, 200, and 300, e.g., the internal resistor 118 and the external resistor 312, can be increased to reduce the power consumption. As a result, the current flowing through the thermistor 130 can be decreased. Thus, when the temperature varies, the corresponding voltage change of the temperature sense voltage at node 302 or 122 can be decreased. By way of example, the temperature may reach the temperature threshold. The temperature sense voltage is then equal to the threshold voltage. If the temperature is increased, the temperature sense voltage can be decreased to less than the threshold voltage. In some circumstances, the voltage change of the temperature sense voltage may be lower than an offset voltage of the comparator 120, or the relatively small voltage change of the temperature sense voltage may be affected by coupling noise of the comparator 120. Thus, the detection signal OTA, e.g., a high electric level, may not be generated to indicate the over-temperature condition. As such, the accuracy of the over-temperature detection circuits 100, 200, and 300 may be degraded.

SUMMARY

In one embodiment, a temperature detection circuit includes a sensor, an integrated circuit (IC) chip, and a resistor. The sensor is operable for sensing a temperature. The IC chip is operable for comparing the sense voltage indicative of the temperature with a threshold voltage indicative of a temperature threshold to determine a temperature condition. The IC chip has a substantially constant parameter. The resistor is externally coupled to the IC chip. The IC chip maintains a current ratio, including a ratio of a first current flowing through the sensor to a second current flowing through the resistor, equal to the substantially constant parameter.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments in accordance with the present disclosure provide a temperature detection circuit. The temperature detection circuit includes an external resistor, a sensor, e.g., a thermistor, and an integrated circuit (IC) chip. The sensor can sense a temperature, e.g., of a power source. The IC chip coupled to the sensor can compare a sense voltage indicative of the temperature with a threshold voltage indicative of a temperature threshold to determine a temperature condition. The external resistor is externally coupled to the IC chip. The IC chip has a substantially constant parameter K, and is capable of maintaining a current ratio, including a current ratio of a current flowing through the sensor to a current flowing through the external resistor, equal to the substantially constant parameter K.

Advantageously, the temperature condition, e.g., of the power source, is determined by the resistance relationship between the thermistor and the external resistor. For example, when the temperature reaches the temperature threshold, the resistance of the thermistor depends on the resistance of the external resistor (R_external) and the substantially constant parameter K (for example, at the temperature threshold, the resistance of the thermistor can be equal to R_external/K). During operation, the resistance of the thermistor is compared to R_external/K to determine the temperature condition. The external resistor has less resistance variation than the internal resistors integrated on the IC chip. Thus, both the resistance of the external resistor and the substantially constant parameter K are relatively accurate, which can improve the accuracy of a result of the comparison. Therefore, the overall accuracy of the temperature detection circuit is further improved.

Figure 4:
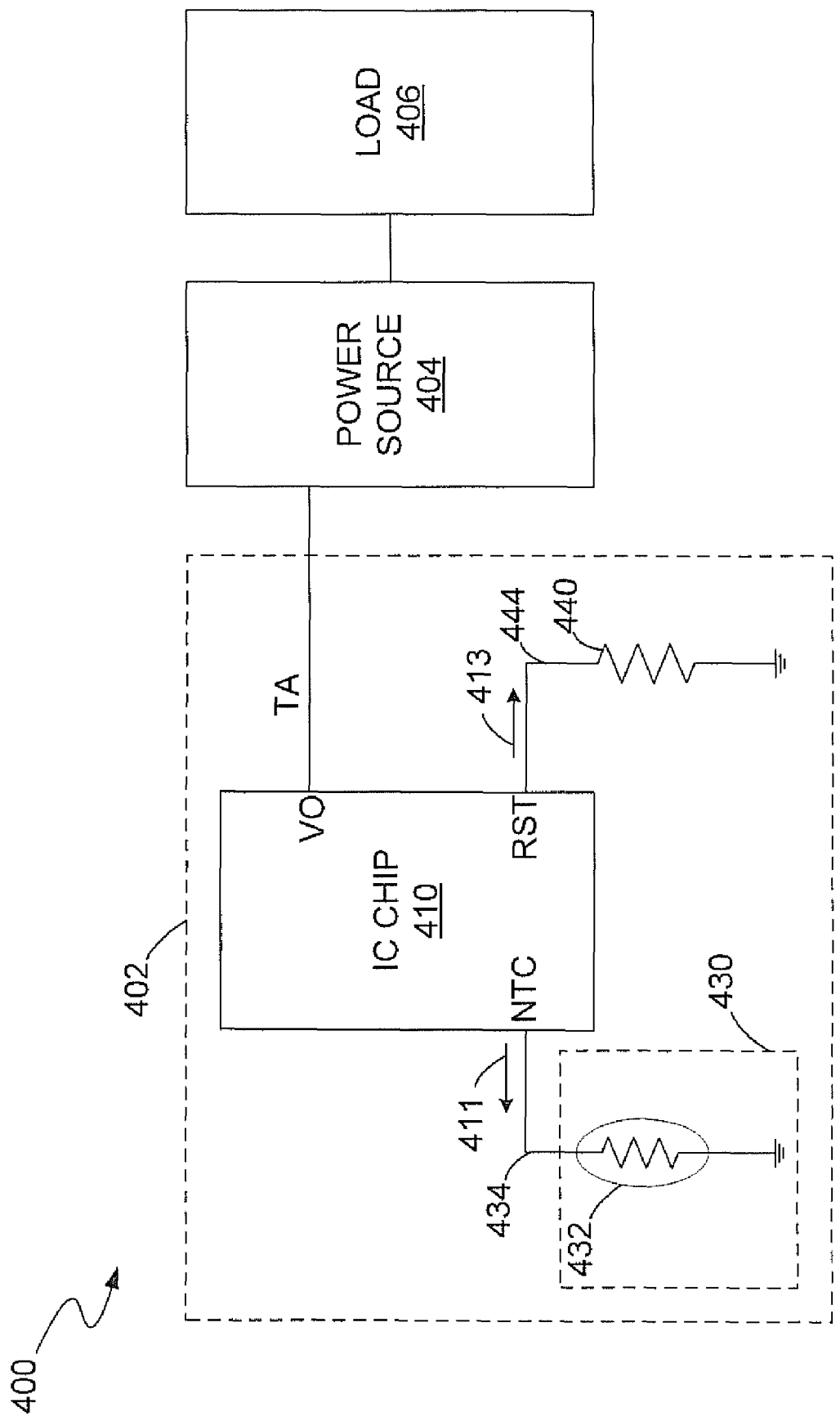
FIG. 4 illustrates a block diagram of an electronic system, in accordance with one embodiment of the present invention.

FIG. 4 illustrates a block diagram of an electronic system 400, in accordance with one embodiment of the present invention. In one embodiment, the electronic system 400 can include a power source 404, a load 406, and a temperature detection circuit 402. The load 406 coupled to the power source 404 is operable for receiving power from the power source 404. The temperature detection circuit 402 coupled to the power source 404 is operable for sensing a temperature of the power source 404 and for generating a temperature detection signal TA at a pin VO to indicate whether the power source 404 is in a normal temperature condition or an abnormal temperature condition, e.g., an over-temperature condition or an under-temperature condition. The power source 404 performs over-temperature protection (OTP) or under-temperature protection (UTP) if the temperature detection signal TA indicates that the temperature of the power source 404 undergoes the abnormal temperature condition. For example, the power source 404 can be a battery pack. If the temperature detection signal TA from the temperature detection circuit 402 indicates that a temperature of the battery pack is abnormal, the temperature detection signal TA can be used to terminate the battery charging or discharging such that the battery pack is protected from the abnormal temperature condition. The temperature detection circuit 402 can be employed to detect a temperature of a device in other electronic systems, and is not limited to the example of FIG. 4.

In the example of FIG. 4, the temperature detection circuit 402 includes an integrated circuit (IC) chip 410 and peripheral elements of the IC chip 410 including a sensor 430 and an external resistor 440. The sensor 430 is externally coupled to the chip 410 via a pin NTC (e.g., a dedicated analog pin) and is operable for sensing a temperature. In one embodiment, the sensor 430 can include a negative temperature coefficient (NTC) thermistor 432 coupled to ground, which exhibits a decrease in electrical resistance when subjected to an increase in body temperature. In one embodiment, the IC chip 410 provides a current 411 to the NTC thermistor 432. As the current 411 flows through the NTC thermistor 432, a voltage 434 across the NTC thermistor 432 is generated. Alternatively, the IC chip 410 provides a reference voltage, e.g., a bandgap voltage, at the NTC pin. As the reference voltage is applied across the thermistor 432, the current 411 through the NTC thermistor 432 is generated. The sensor 430 can include other components such as a positive temperature coefficient (PTC) thermistor, a thermocouple, a resistance temperature detector (RTD), or an IC temperature sensor, etc., and is not limited to the example of FIG. 4.

The external resistor 440 is externally coupled to the IC chip 410 via a pin RST (e.g., a dedicated analog pin or a composite analog pin) and to ground. In one embodiment, the IC chip 410 can provide a current 413 flowing through the external resistor 440, such that a voltage 444 is generated at the pin RST. Alternatively, the IC chip 410 can provide a reference voltage, e.g., a bandgap voltage, at the pin RST such that the current 413 is generated through the external resistor 440.

In one embodiment, the IC chip 410 has a substantially constant parameter K. The IC chip 410 can maintain a current ratio of the current 411 to the current 413 to be equal to the substantially constant parameter K. As used herein, the term "substantially constant" means that the value of K can vary but remains within a range such that the accuracy of the voltage 434 and the voltage 444 would not be affected by variations of the current 413 and the current 411, which will be described further in relation to FIG. 5, FIG. 6 and FIG. 7. More specifically, the current 411 flowing through the thermistor 432 is determined by the parameter K and the current 413 flowing through the external resistor 440. In one embodiment, the current 411 is proportional to the current 413, and a current ratio of the current 411 to the current 413 is equal to the substantially constant parameter K. Moreover, the IC chip 410 can compare a sense voltage V_sensing indicative of (e.g., proportional to) the sensed temperature to a threshold voltage VTH indicative of a temperature threshold, e.g., an over-temperature threshold or an under-temperature threshold, and outputs the temperature detection signal TA according to a result of the comparison. In one embodiment, the voltage 434 provided by the thermistor 432 is used as the sense voltage V_sensing. In this condition, the threshold voltage VTH can be the voltage 444 across the external resistor 440 or a reference voltage V_ref generated by a reference voltage generator. Alternatively, the threshold voltage VTH can be the reference voltage V_ref, which is also the voltage 434 across the thermistor 432. In this condition, the voltage 444 is used as the sense voltage V_sensing indicating the sensed temperature. The operation of the sense voltage V_sensing and the threshold voltage VTH will be further described in relation to FIG. 5-10.

Advantageously, by providing the current 411 proportional to the current 413, the temperature detection signal TA is determined by the external resistor 440 and a substantially constant value, e.g., the substantially constant value can be K or M*K, which will be described further in relation to FIG. 5-10. Since the resistor (e.g., the external resistor 440) associated with the temperature detection in the temperature detection circuit 402 resides outside the IC chip 410, resistance variation of the external resistors can be less than that of the internal resistors (e.g., the resistor 112 in FIG. 1). Thus, the accuracy of the temperature detection signal TA can be improved to provide more reliable temperature protection.

Figure 5:
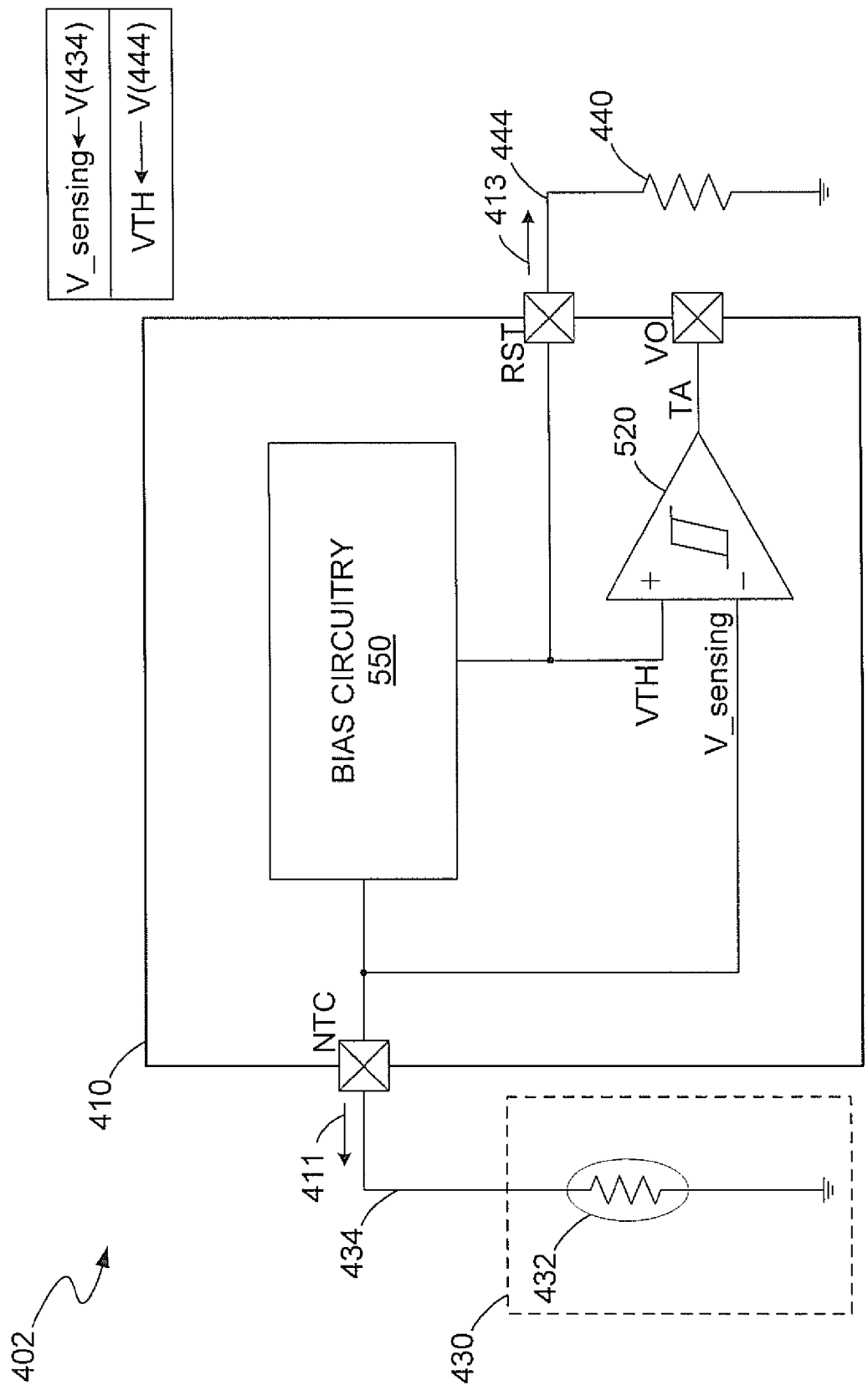
FIG. 5 illustrates an example of a diagram of a temperature detection circuit, in accordance with one embodiment of the present invention.

FIG. 5 illustrates an example of a diagram of the temperature detection circuit 402, in accordance with one embodiment of the present invention. Elements labeled the same as in FIG. 4 have similar functions. FIG. 5 is described in combination with FIG. 4. In the example of FIG. 5, the voltage 444 across the external resistor 440 also serves as the threshold voltage VTH to indicate the temperature threshold, and the voltage 434 across the thermistor 432 also serves as the sense voltage V_sensing to indicate the sensed temperature. Thus, in the following description in relation to FIG. 5-7, the sense voltage V_sensing is referred to as the sense voltage 434, and the threshold voltage VTH is referred to as the threshold voltage 444.

In one embodiment, the IC chip 410 can include a comparator 520 and bias circuitry 550. The bias circuitry 550 coupled to the pin NTC and to the pin RST is operable for generating the current 411 flowing through the NTC thermistor 432, which generates the sense voltage 434 at the pin NTC accordingly. In one embodiment, the bias circuitry 550 can also generate the current 413 through the external resistor 440, which generates the threshold voltage 444 at the pin RST accordingly. Alternatively, the bias circuitry 550 can generate the threshold voltage 444 at the pin RST directly. Provided with the threshold voltage 444, the external resistor 440 can provide the current 413 accordingly.

In one embodiment, the current 411 provided by the IC chip 410 is proportional to the current 413. The current ratio of the current 411 to the current 413 can be the substantially constant value, e.g., the parameter K of the IC chip 410. As mentioned above, "substantially constant" means that the value can vary but remains within a range such that the accuracy of the sense voltage 434 and the threshold voltage 444 would not be affected by the variations of the current 411 and the current 413.

In one embodiment, the comparator 520 has one terminal coupled to the pin NTC and another terminal coupled to the pin RST. The comparator 520 is operable for comparing the sense voltage 434 with the threshold voltage 444 to output the temperature detection signal TA. In one embodiment, the comparator 520 is a hysteretic comparator. More specifically, if the sense voltage 434 is less than the threshold voltage 444 indicating a predetermined over-temperature threshold, e.g., when the temperature rises above the predetermined over-temperature threshold, the temperature detection signal TA (e.g., a high level electrical signal) is generated to indicate an over-temperature condition, in one embodiment. Similarly, if the sense voltage 434 is greater than the threshold voltage 444 indicating a predetermined under-temperature threshold, e.g., when the temperature drops below the predetermined under-temperature threshold, the temperature detection signal TA (e.g., a low level electrical signal) is generated to indicate an under-temperature condition.

As the current ratio of the current 411 to the current 413 is the parameter K, the level of the sense voltage 434 can be given by:

$$V\_sensing = K * I\_external * R\_thermistor, \quad (1)$$

where V_sensing represents the level of the sense voltage 434, I_external represents the level of the current 413, and R_thermistor represents the resistance of the NTC thermistor 432. Advantageously, the current 411 is K times the current 413. Thus, when the temperature varies, the voltage change of the sense voltage 434 can be adjusted to be relatively high, e.g., a user can set the substantially constant parameter K. As such, the effect on the operation of the comparator 520 of the offset voltage and coupling noise is reduced, in which case the accuracy of the temperature detection circuit 402 is improved.

In one embodiment, if the temperature reaches the temperature threshold, the sense voltage 434 can become equal to the threshold voltage 444, indicating the temperature threshold according to:

$$V\_threshold = I\_external * R\_external = K * I\_external * R\_thermistor\_T \quad (2)$$

where R_thermistor_T represents the resistance of the NTC thermistor 432 at the temperature threshold, and R_external represents the resistance of the external resistor 440. Therefore, the resistance of the NTC thermistor 432 at the temperature threshold (e.g., an over-temperature threshold or an under-temperature threshold) can be given by:

$$R\_thermistor\_T = R\_external / K. \quad (3)$$

As such, the temperature condition is indicated by the resistance relationship between the NTC thermistor 432 and the external resistor 440 according to equation (3). That is, the temperature detection signal TA is determined by a comparison of the resistance of the thermistor 432 to the function of the resistance of the external resistor 440 and the parameter K. For example, if R_thermistor is less than R_external/K, e.g., when the temperature rises above the over-temperature threshold, the temperature detection signal TA (e.g., a high level electrical signal) is generated to indicate an over-temperature condition, in one embodiment. Similarly, if R_thermistor is greater than R_external/K, e.g., when the temperature drops below the under-temperature threshold, the temperature detection signal TA (e.g., a low level electrical signal) is generated to indicate an under-temperature condition.

Advantageously, the temperature detection signal TA depends on the resistance of the external resistor 440 and the parameter K. Since the external resistor 440 has less resistance variation than the internal resistors integrated on the IC chip and the parameter K of the IC chip 410 is substantially constant, both R_external and K can be relatively accurate. As such, the accuracy of a result of the comparison is improved, which can further improve the overall accuracy of the temperature detection circuit 402. Moreover, based on equation (3), the resistance of the external resistor 440 can be adjusted, e.g., by a user, to achieve the temperature detection for various temperature threshold. As such, the flexibility of the temperature detection circuit 402 is improved.

Figure 6:
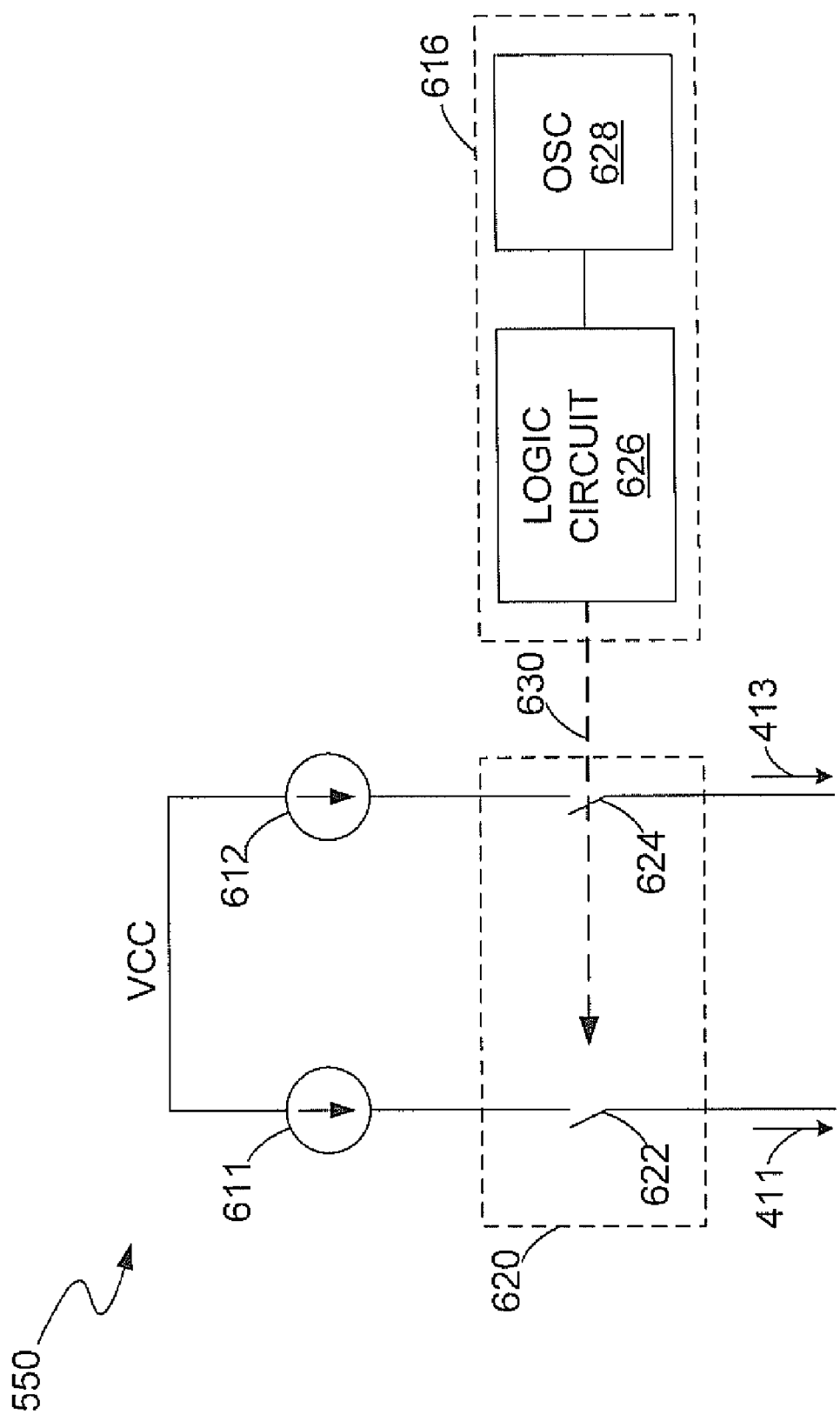
FIG. 6 illustrates an example of bias circuitry, in accordance with one embodiment of the present invention

FIG. 6 illustrates an example of the bias circuitry 550 of FIG. 5, in accordance with one embodiment of the present invention. FIG. 6 is described in combination with FIG. 4 and FIG. 5. In the example of FIG. 6, the bias circuitry 550 can include a current source 611 and a current source 612 for generating the current 411 and the current 413, respectively. The current 411 is proportional to the current 413. The current ratio of the current 411 to the current 413 can be the substantially constant parameter K, as described in relation to FIG. 5.

In one embodiment, the bias circuitry 550 can further include a switching circuit 620 and a switch controller 616. The switching circuit 620 includes a switch 622 and a switch 624 coupled to the current source 611 and the current source 612, respectively. The switch 622 and the switch 624 are operable for enabling and disabling current paths of the current 411 and the current 413, respectively.

The switch controller 616 is operable for generating a control signal 530, e.g., a pulse width modulation (PWM) signal, to control the states of the switch 622 and the switch 624. In one embodiment, the switch controller 616 can include an oscillation (OSC) circuit 628 and a logic circuit 626. The oscillation circuit 628 can generate an oscillation signal, e.g., a periodic pulse signal. The logic circuit 626 can receive the oscillation signal and can generate the control signal 630, e.g., a PWM signal. Alternatively, the switch controller 616 can include other components, and is not limited to the example of FIG. 6.

As a result, the switching circuit 620 can alternately enable and disable the current paths for the currents 411 and 413. More specifically, in one embodiment, if the PWM signal is high, the switch 622 and the switch 624 can be switched on to enable the current 411 and the current 413, respectively. The NTC thermistor 432 can receive the current 411 and can provide the sense voltage 434 based on the current 411. The external resistor 440 can receive the current 413 and can provide the threshold voltage 444 based on the current 413. The comparator 520 can compare the sense voltage 434 to the threshold voltage 444, and can output the temperature detection signal TA based on a result of the comparison as discussed in relation to FIG. 4 and FIG. 5.

In the example of FIG. 6, the currents 411 and 413 generated by the current sources 611 and 612 may vary if the temperature of the IC chip 410 is changed. Advantageously, the ratio of the current 411 to the current 413 can be maintained to be the substantially constant parameter K. By way of example, if the current 413 is increased, the threshold voltage 444 and the sense voltage 434 can be both increased accordingly. That is, the sense voltage 434 at the temperature threshold and the threshold voltage 444 can be both automatically adjusted by the same amount according to equation (2), and equation (3) is still achieved. As such, the accuracy of the detection signal TA generated based on the sense voltage 434 and the threshold voltage 444 is increased. In other words, the effect of the sensing errors caused by variation of the current 413 on the temperature detection circuit 402 is reduced/eliminated, which can improve the overall accuracy of the temperature detection circuit 402.

If the PWM signal is low, the switch 622 and the switch 624 can be switched off, such that the current 411 and the current 413 are disabled. Advantageously, the NTC thermistor 432 and the external resister 440 do not consume energy when the switch 622 and the switch 624 are turned off. Therefore, the temperature can be sensed on demand and the power consumption of the temperature detection circuit 402 can be reduced.

Figure 7:
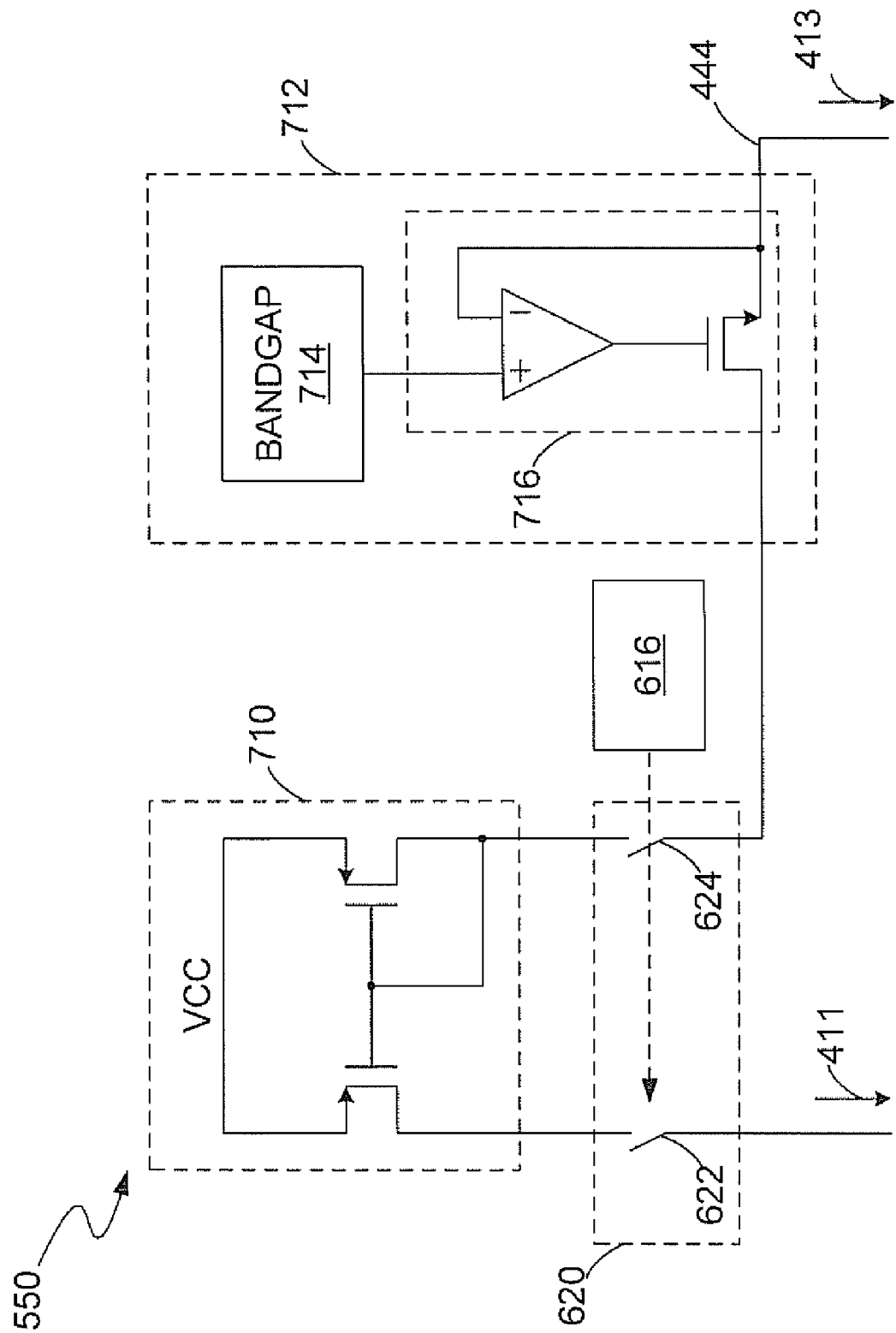
FIG. 7 illustrates another example of bias circuitry, in accordance with one embodiment of the present invention.

FIG. 7 illustrates another example of the bias circuitry 550 of FIG. 5, in accordance with one embodiment of the present invention. FIG. 7 is described in combination with FIG. 4, FIG. 5, and FIG. 6. Elements labeled the same as in FIG. 4 and FIG. 6 have similar functions.

In the example of FIG. 7, the bias circuitry 550 includes a current mirror 710, a reference voltage generator 712, a switch controller 616, and a switching circuit 620 having a switch 622 and a switch 624. The reference voltage generator 712 is operable for generating the threshold voltage 444, and can include a bandgap circuit 714 and a voltage follower 716. The bandgap circuit 714 can generate a bandgap reference voltage which remains substantially constant if the temperature varies. The voltage follower 716 can include an operational amplifier (op-amp) and can receive the bandgap reference voltage. The voltage follower 716 can follow the bandgap reference voltage and can output the threshold voltage 444 that is approximately equal to the bandgap reference voltage. Alternatively, the reference voltage generator 712 can include other components and is not limited to the example of FIG. 7.

The switching circuit 620 can alternately enable and disable current paths for the current 411 and the current 413. If the switch 622 and the switch 624 are turned on, the external resistor 440 can receive the threshold voltage 444 from the reference voltage generator 712 and can provide the current 413 based on the threshold voltage 444, in one embodiment. Since the threshold voltage 444 is a bandgap voltage, which will not significantly vary with the temperature, the current 413 flowing through the external resistor 440 is also independent of the temperature. As such, errors caused by the variation of the current 413 are also eliminated or avoided.

In one embodiment, the current mirror 710 can receive the current 413 and can generate the current 411, which is K times the current 413, by mirroring the current 413. The NTC thermistor 432 can receive the current 411 and can generate the sense voltage 434 based on the current 411. Therefore, the comparator 520 can compare the sense voltage 434 to the reference voltage 444, and can generate the temperature detection signal TA based on a result of the comparison.

If the switch 622 and the switch 624 are turned off, the NTC thermistor 432 and the external resistor 440 will not consume electrical energy. Advantageously, the temperature can be sensed on demand and the power consumption of the temperature detection circuit 402 can be reduced. The bias circuitry 550 can be constituted by other components, and is not limited to the example of FIG. 6 and FIG. 7.

Figure 1:
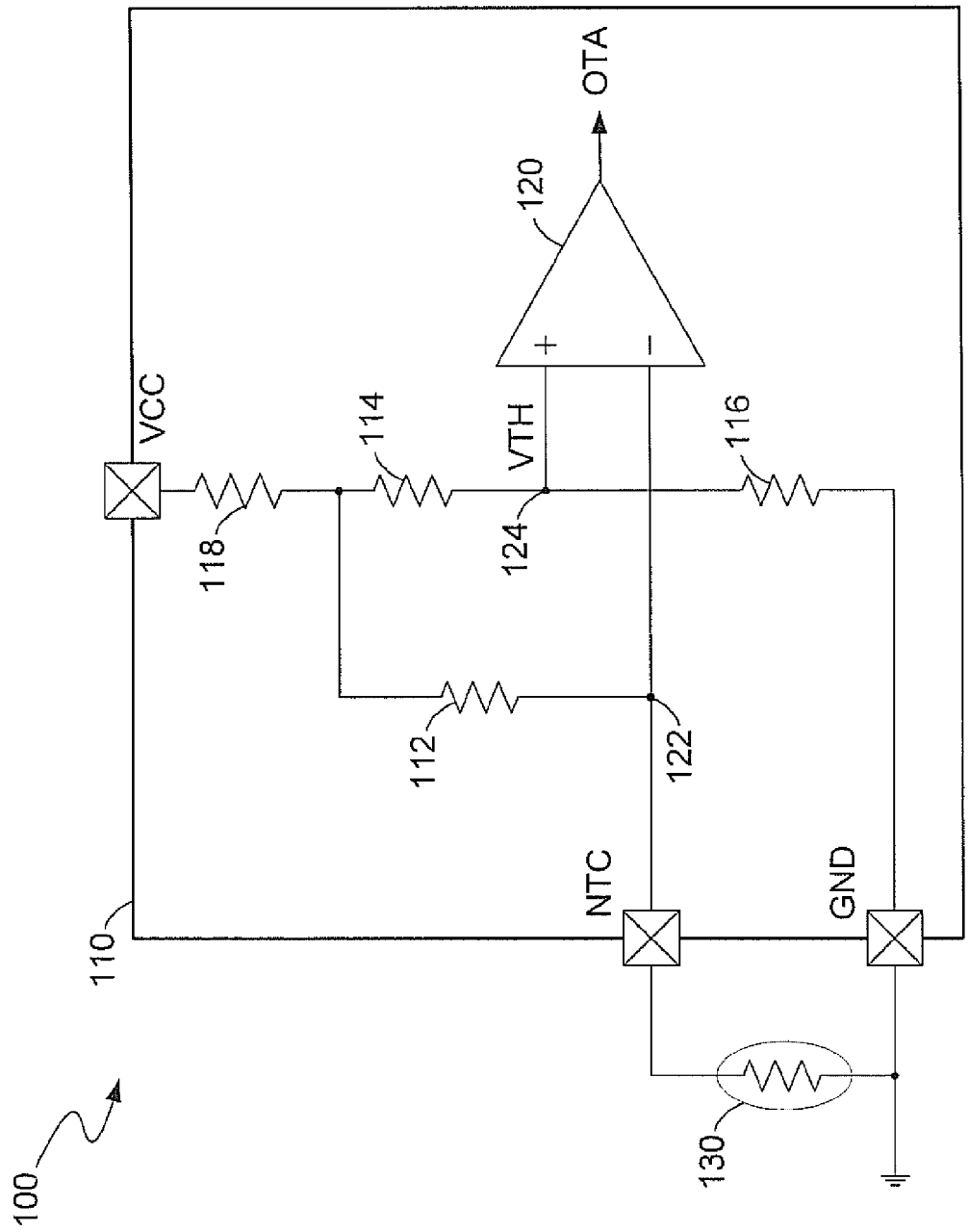
FIG. 1 illustrates a schematic diagram of a conventional over-temperature protection circuit.
Figure 2:
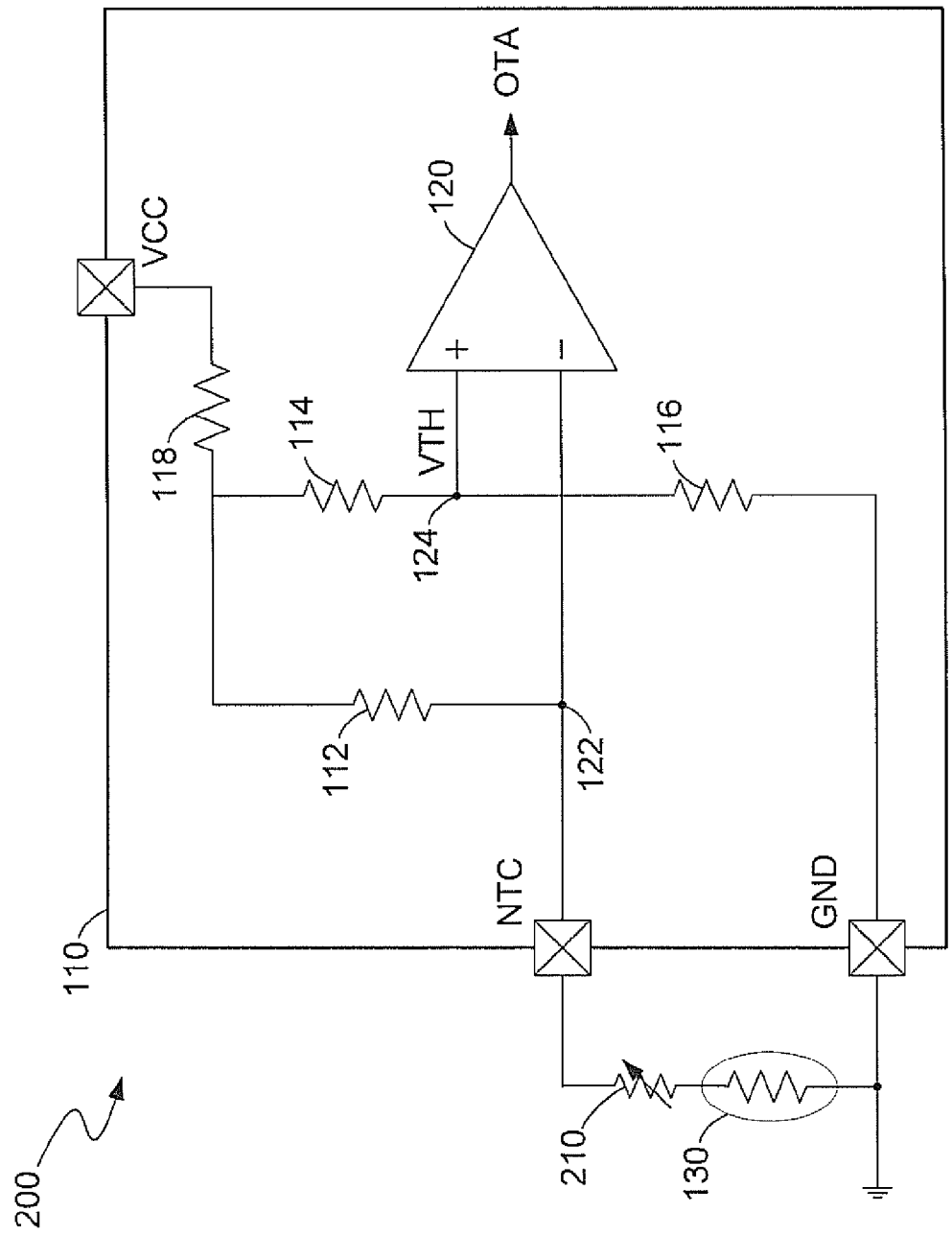
FIG. 2 illustrates a schematic diagram of a conventional over-temperature protection circuit.
Figure 3:
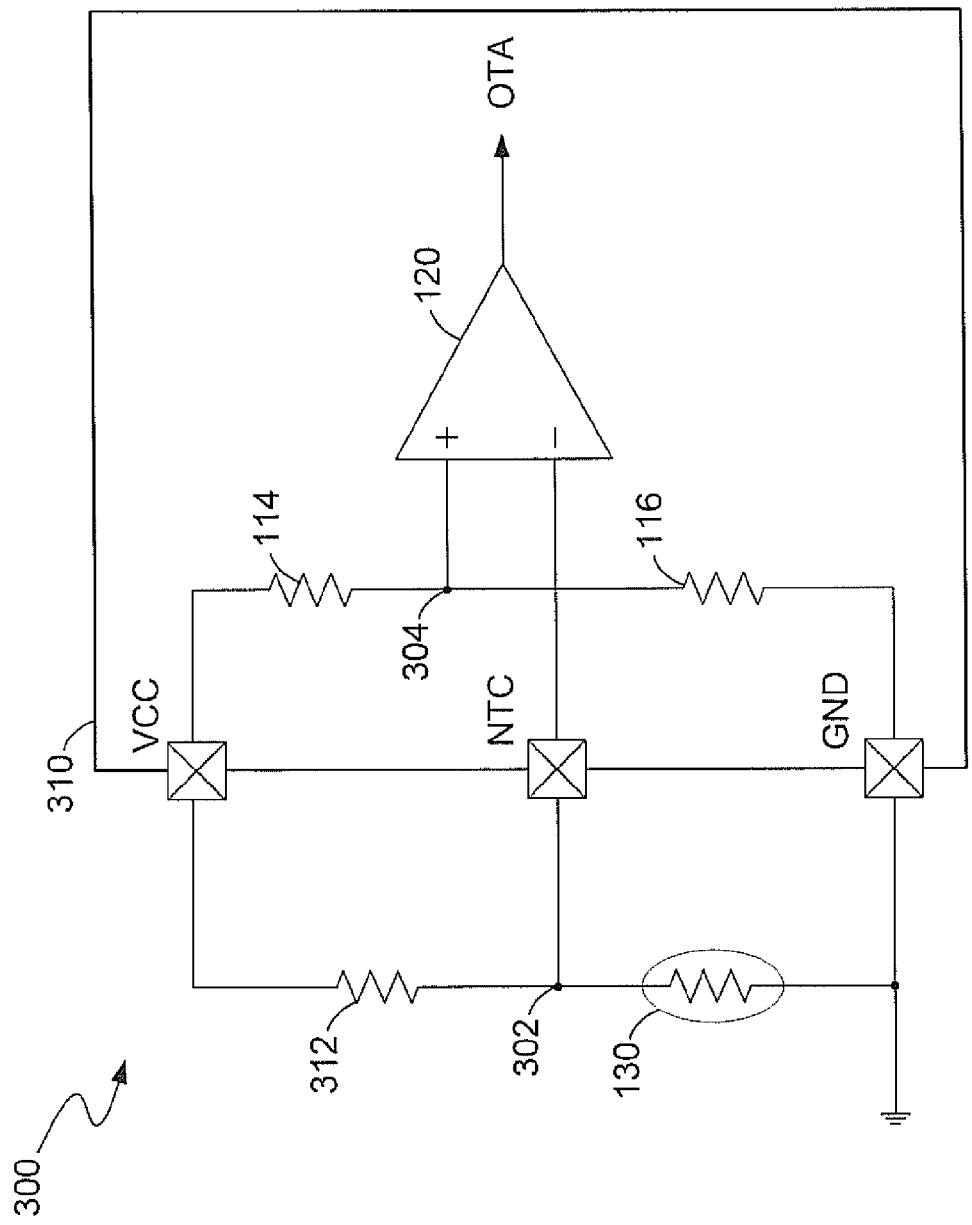
FIG. 3 illustrates a schematic diagram of a conventional over-temperature protection circuit.

Advantageously, the internal resistors (e.g., the resistor 112, the resistor 114, the resistor 116 and the resistor 118 of FIG. 1) can be replaced by the bias circuitry 550 of FIG. 6 or FIG. 7 and the external resistor 440, such that the chip size and the cost of the temperature detection circuit 402 can be reduced.

Figure 8:
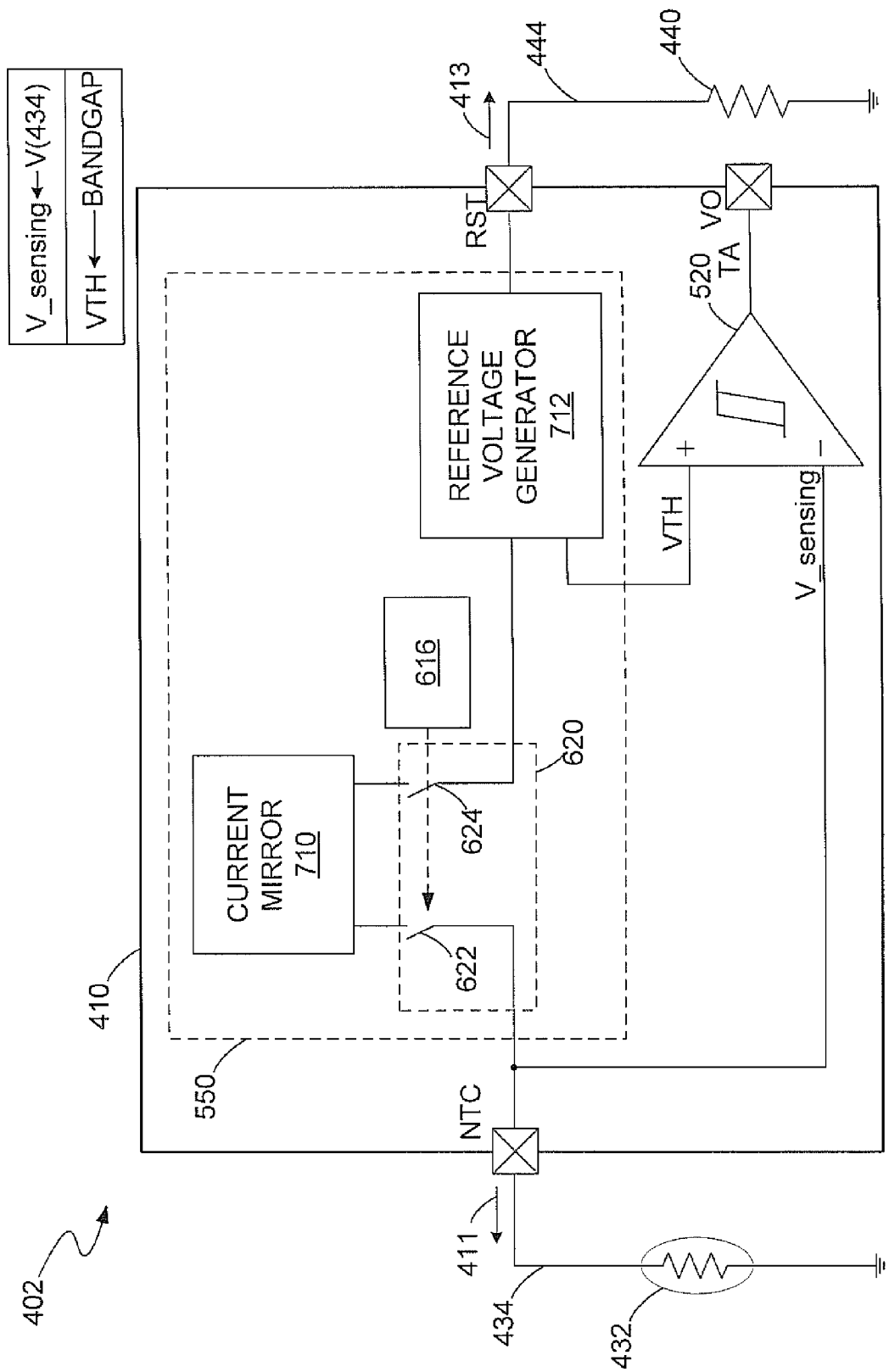
FIG. 8 illustrates another example of a diagram of a temperature detection circuit, in accordance with one embodiment of the present invention.

FIG. 8 illustrates another example of a diagram of a temperature detection circuit 402, in accordance with one embodiment of the present invention. FIG. 8 is described in combination with FIG. 4, FIG. 5, and FIG. 7. Elements labeled the same as in FIG. 4-FIG. 7 have similar functions.

In one embodiment, the IC chip 410 includes the comparator 520 and the bias circuitry 550. The bias circuitry 550 can employ the architecture disclosed hereinabove in FIG. 7. In the example of FIG. 8, the reference voltage generator 712 can generate the reference voltage 444, which is applied by the external resistor 440 to provide the current 413. In a similar way, the reference voltage generator 712 can also generate the threshold voltage VTH indicative of the temperature threshold. Both the reference voltage 444 and the threshold voltage VTH can be bandgap voltages. The current mirror 710 generates the current 411 proportional to the current 413 by mirroring the current 413. The current ratio of the current 411 to the current 413 can be the substantially constant value K. The NTC thermistor 432 can receive the current 411 and can generate the sense voltage 434 based on the current 411.

Therefore, when the temperature reaches the predetermined temperature threshold, the sense voltage 434 becomes equal to the threshold voltage VTH according to equation (2). As I_external is equal to a voltage level of the reference voltage 444 (e.g., V_ref) divided by the resistance of the external resistor 440, e.g., I_external=V_ref/R_external, equation (2) can be rewritten as:

$$R\_thermistor\_T = V\_threshold * R\_external / (V\_ref * K). \quad (4)$$

As shown in equation (4), R_thermistor_T is equal to a function of the reference voltage 444, the resistance of the external resistor 440, the threshold voltage VTH, and the substantially constant parameter K.

Since both V_threshold and V_ref are bandgap voltages, e.g., the bandgap voltages can remain to be substantially constant when the temperature varies, a ratio of V_ref to V_threshold, e.g., V_ref/V_threshold, can be substituted for a substantially constant value M. Thus, equation (5) is obtained according to equation (4).

$$R\_thermistor\_T = R\_external / (M*K). \quad (5)$$

As shown in equation (5), R_thermistor_T is equal to a function of the resistance of the external resistor 440 and the substantially constant value M*K.

Advantageously, the temperature condition, e.g., of the power source 404, is determined by the resistance relationship between the NTC thermistor 432 and the external resistor 440 according to equation (5). For example, the temperature detection signal TA is determined by a comparison of the resistance of the thermistor 432 to the function of R_external and K*M. Since both R_external and K*M are relatively accurate, the accuracy of a result of the comparison is improved, which can further improve the overall accuracy of the temperature detection circuit 402.

Figure 9:
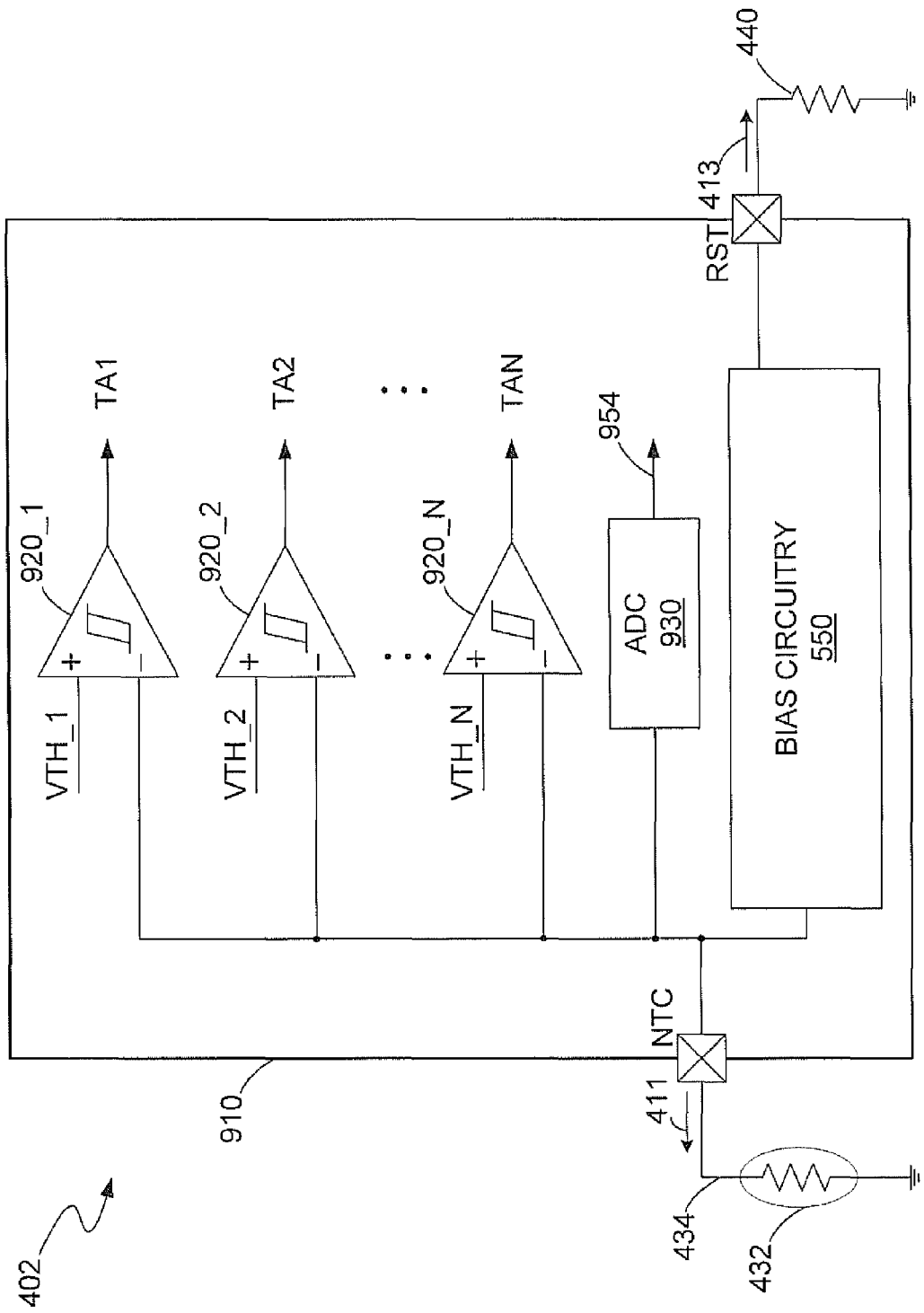
FIG. 9 illustrates another example of a diagram of a temperature detection circuit, in accordance with one embodiment of the present invention.

FIG. 9 illustrates another example of a diagram of the temperature detection circuit 402, in accordance with one embodiment of the present invention. FIG. 9 is described in combination with FIG. 4-FIG. 8. Elements labeled the same as in FIG. 4 and FIG. 5 have similar functions. In the example of FIG. 9, the temperature detection circuit 402 can determine the temperature condition, e.g., of the power source 404, according to multiple different temperature thresholds.

In one embodiment, the temperature detection circuit 402 includes the NTC thermistor 432, an IC chip 910, and the external resistor 440. The IC chip 910 can include the bias circuitry 550, an analog to digital converter (ADC) 930, and multiple comparators 920_1-920_N. Not all the comparators 920_1-920_N are shown in FIG. 9 for purposes of brevity and clarity. The bias circuitry 550 can employ the architecture disclosed hereinabove in FIG. 7 or FIG. 8, and is operable for generating the current 411 proportional to the current 413. The current ratio of the current 411 to the current 413 can be the substantially constant value K. The bias circuitry 550 can also generate a bandgap voltage to provide the reference voltage 444. The NTC thermistor 432 can receive the current 411 and can generate the sense voltage 434 based on the current 411. In one embodiment, multiple threshold voltages VTH_1-VTH_N can be generated by one or more reference voltage generators. For example, VTH_1-VTH_N are bandgap voltages generated by the reference voltage generator 712. The multiple threshold voltages VTH_1-VTH_N can indicate multiple predetermined temperature thresholds.

In one embodiment, each comparator 920_1-920_N can receive the sense voltage 434 and a corresponding reference threshold voltage VTH_1-VTH_N. For example, the comparator 920_1 can receive the sense voltage 434 and a reference threshold voltage VTH_1, the comparator 920_2 can receive the sense voltage 434 and a reference threshold voltage VTH_2, and the comparator 920_N can receive the sense voltage 434 and a reference threshold voltage VTH_N. Advantageously, the comparators 920_1-920_N can generate multiple temperature detection signals TA1-TAN corresponding to different temperature thresholds. As a result, the temperature detection circuit 402 can achieve temperature detection for the different temperature thresholds at the same time.

In one embodiment, the ADC 930 is capable of converting the sense voltage 434 to a digital sense signal 954. The digital sense signal 954 can be employed for other applications. For example, the digital sense signal 954 can be stored in a storage medium (e.g., a memory) of a computer and can be used to display the temperature level on a computer screen.

Figure 10:
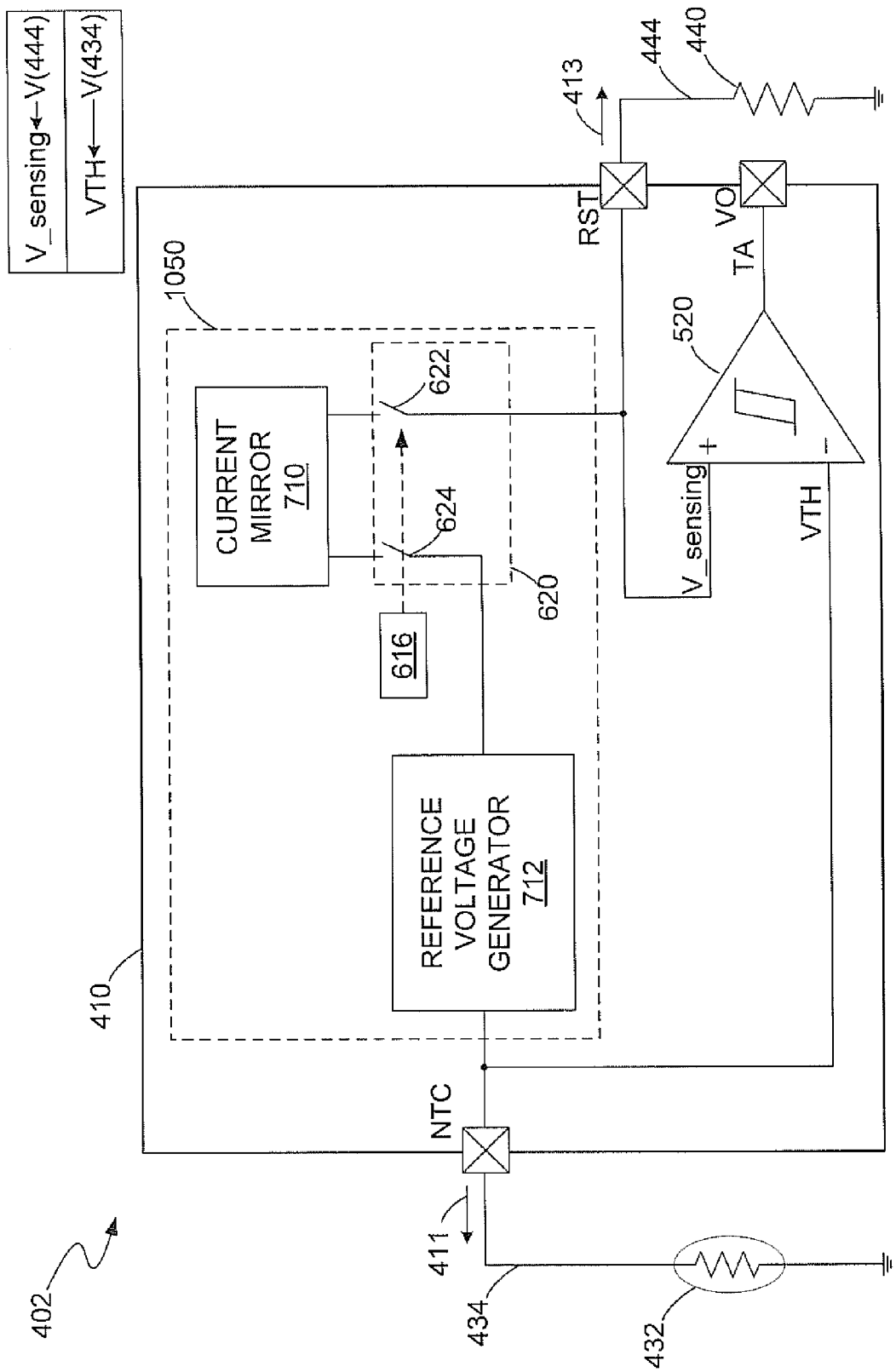
FIG. 10 illustrates another example of a diagram of a temperature detection circuit, in accordance with one embodiment of the present invention.

FIG. 10 illustrates another example of a diagram of the temperature detection circuit 402, in accordance with one embodiment of the present invention. FIG. 10 is described in combination with FIG. 4-FIG. 7. Elements labeled the same as in FIG. 4-FIG. 7 have similar functions.

In the example of FIG. 10, the IC chip 410 includes bias circuitry 1050 and the comparator 520. The bias circuitry 1050 includes the reference voltage generator 712 operable for generating the reference voltage V_ref, e.g., a bandgap voltage, at the pin NTC, instead of at the pin RST as in the bias circuitry 550 of FIG. 7. Since the reference voltage V_ref is also across the thermistor 432, the reference voltage V_ref can also be referred to as the reference voltage 434 in the example of FIG. 10. When the switches 622 and 624 are turned on, the reference voltage 434 is applied by the thermistor 432 to generate the current 411. In this embodiment, the reference voltage 434 also serves as the threshold voltage VTH, which can be given by:

$$VTH = V\_ref. \quad (6)$$

The bias circuitry 1050 further includes the current mirror 710 operable for mirroring the current 411 to generate the current 413. The current ratio of the current 411 to the current 413 is equal to the substantially constant parameter K. The current 413 is applied by the external resistor 440 to provide the voltage 444.

Since the voltage 434 is a reference voltage provided by the reference voltage generator 712, the current 411 can vary in accordance with the temperature due to the resistance variation of the thermistor 432, which can further cause the voltage 444 to vary. As such, in the example of FIG. 10, the voltage 444 serves as the sense voltage V_sensing to indicate the sensed temperature. Thus, the sense voltage V_sensing is also referred to as the sense voltage 444, in this embodiment. When the temperature reaches the temperature threshold, the sense voltage 444 can be represented according to equation (7).

$$V\_sensing = (V\_ref/R\_thermistor\_T) * K * R\_external. \quad (7)$$

The comparator 520 compares the sense voltage 444 to the threshold voltage 434 and determines the temperature condition according to a result of the comparison. When the temperature reaches the temperature threshold, the sense voltage 444 becomes equal to the threshold voltage 434. Based on equations (6) and (7), the resistance of the thermistor 432 at the temperature threshold can be given by:

$$R\_thermistor\_T = K * R\_external. \quad (8)$$

Similar to the discussion of equation (3) in relation to FIG. 5, the temperature condition is indicated by the resistance relationship between the NTC thermistor 432 and the external resistor 440 according to equation (8). In other words, the resistance of the thermistor 432 is compared to a function of the substantially constant parameter K and the resistance of the external resistor 440 to determine the temperature condition. Since both the resistance of the external resistor 440 and the parameter K is relatively accurate, the overall accuracy of the temperature detection circuit 402 is also improved.

Figure 11:
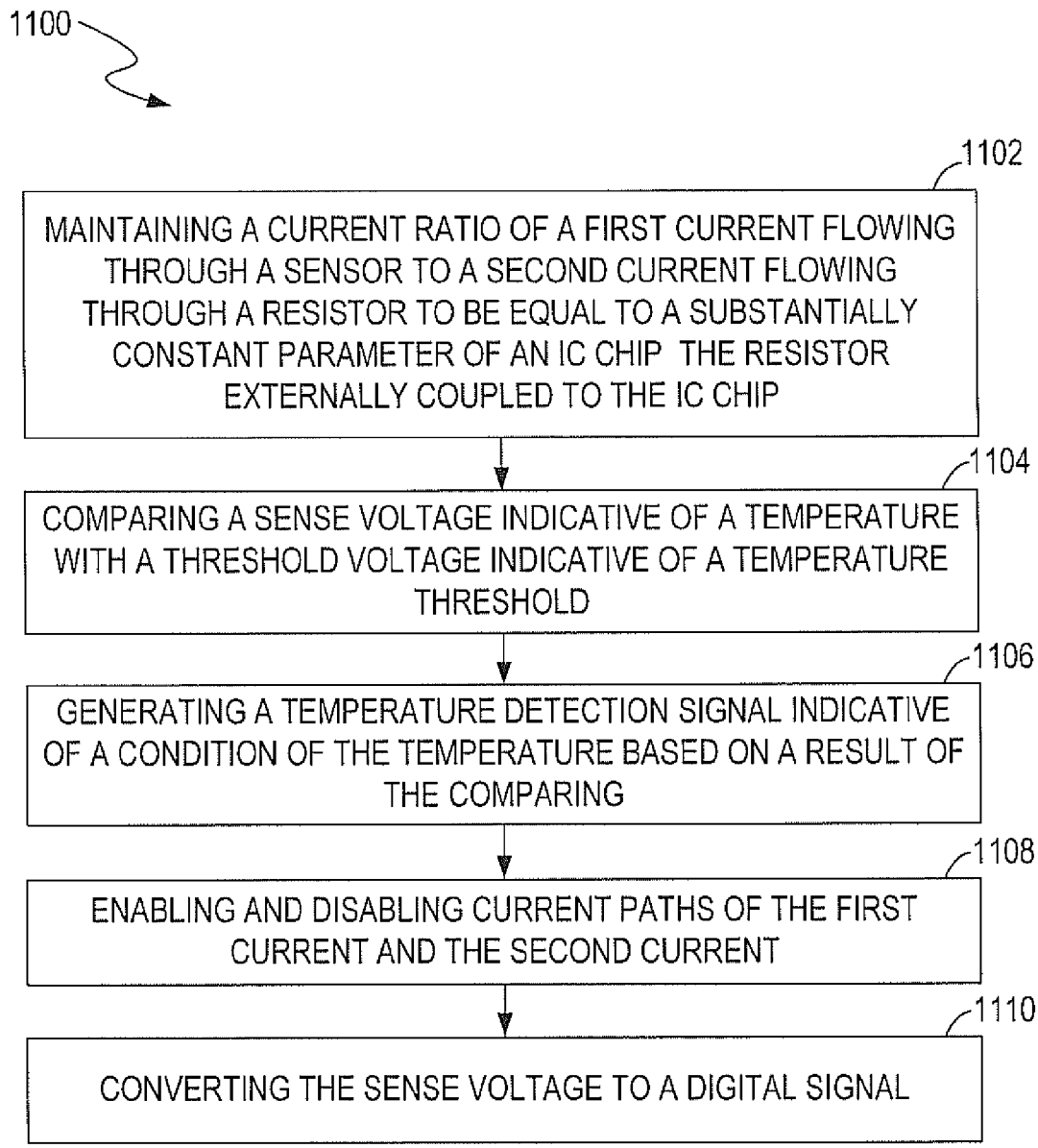
FIG. 11 illustrates a flowchart of operations performed by a temperature detection circuit, in accordance with one embodiment of the present invention.

FIG. 11 illustrates a flowchart 1100 of operations performed by a temperature detection circuit, e.g., the temperature detection circuit 402, in accordance with one embodiment of the present invention. FIG. 11 is described in combination with FIG. 4-FIG. 10. Although specific steps are disclosed in FIG. 11, such steps are examples. That is, the present invention is well suited to performing various other steps or variations of the steps recited in FIG. 11.

In block 1102, a current ratio of a first current, e.g., the current 411, flowing through a sensor, e.g., the thermistor 432, to a second current, e.g., the current 413, flowing through a resistor, e.g., the external resistor 440, is maintained to be equal to a substantially constant parameter, e.g., the parameter K, of an IC chip, e.g., the IC chip 410. The resistor is externally coupled to the IC chip.

In block 1104, a sense voltage indicative of a temperature is compared to a threshold voltage indicative of a temperature threshold.

In block 1106, a temperature detection signal indicative of a condition of the temperature is generated based on a result of the comparison. In one embodiment, a voltage across the resistor is used as the threshold voltage, and the sense voltage is provided by said sensor. In this condition, the temperature detection signal is determined by a comparison of the resistance of the sensor to a function of the substantially constant parameter and the resistance of the resistor. In another embodiment, a reference voltage is generated by a reference voltage generator. The reference voltage is applied by the resistor to generate the second current. The second current is mirrored to generate the first current according to the substantially constant parameter. The sense voltage is provided by the sensor based on the first current. In this condition, the temperature detection signal is determined by a comparison of the resistance of the sensor to a function of the threshold voltage, the reference voltage, the substantially constant parameter, and the resistance of the resistor. In another embodiment, the threshold voltage is generated by a reference voltage generator. The threshold voltage is applied by the sensor to generate the first current. The first current is mirrored to generate the second current according to the substantially constant parameter. The voltage across the resistor is used as the sense voltage. In this condition, the temperature detection signal is determined by a compera of the resistance of the sensor to a function of the substantially constant parameter and the resistance of the resistor.

In block 1108, current paths of the first and second currents are enabled and disabled.

In block 1110, the sense voltage is converted to a digital signal, e.g., the digital signal 954.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A temperature detection circuit comprising;
    a sensor operable for sensing a temperature;
    an integrated circuit (IC) chip coupled to said sensor and operable for comparing a sense voltage indicative of said temperature with a threshold voltage indicative of a temperature threshold to determine a temperature condition, said IC chip having a substantially constant parameter; and
    a resistor externally coupled to said IC chip, wherein said IC chip maintains a current ratio, comprising a ratio of a first current flowing through said sensor to a second current flowing through said resistor, equal to said substantially constant parameter.

2. The temperature detection circuit as claimed in 1, wherein said IC chip further comprises:
    a first current source coupled to said sensor and operable for providing said first current; and
    a second current source coupled to said resistor and operable for providing said second current,
    wherein said sensor provides said sense voltage based on said first current.

3. The temperature detection circuit as claimed in claim 2, wherein said IC chip further comprises:
    a switching circuit coupled to said first and second current sources and operable for enabling and disabling current paths of said first and second currents.

4. The temperature detection circuit as claimed in claim 1, wherein said IC chip further comprises:
    a reference voltage generator coupled to said resistor and operable for generating a reference voltage which is applied to said resistor to generate said second current; and
    a current mirror coupled to said sensor and said resistor and operable for mirroring said second current to generate said first current according to said substantially constant parameter,
    wherein said sensor provides said sense voltage based on said first current.

5. The temperature detection circuit as claimed in claim 4, wherein said IC chip further comprises:
    a switching circuit coupled to said current mirror and operable for enabling and disabling current paths of said first and second currents.

6. The temperature detection circuit as claimed in claim 4, wherein said reference voltage generator is operable for providing a plurality of threshold voltages indicative of a plurality of temperature thresholds.

7. The temperature detection circuit as claimed in claim 6, wherein said IC chip further comprises:
    a plurality of comparators operable for comparing said threshold voltages with said sense voltage.

8. The temperature detection circuit as claimed in claim 4, wherein said temperature condition is determined by a comparison of the resistance of said sensor to a function of said reference voltage, said threshold voltage, said substantially constant parameter, and the resistance of said resistor.

9. The temperature detection circuit as claimed in claim 1, wherein a reference voltage across said resistor is used as said threshold, voltage, and a voltage of said sensor is used as said sense voltage.

10. The temperature detection circuit as claimed in claim 9, wherein said temperature condition is determined by a comparison of the resistance of said sensor to a function of said substantially constant parameter and the resistance of said resistor.

11. The temperature detection circuit as claimed in claim 1, wherein said IC chip further comprises:
a reference voltage generator coupled to said sensor and operable for generating said threshold voltage which is applied to said sensor to generate said first current; and
a current mirror coupled to said sensor and said resistor and operable for mirroring said first current to generate said second current according to said substantially constant parameter,
wherein said resistor provides said sense voltage based on said second current.

12. The temperature detection circuit as claimed in claim 11, wherein said temperature condition is determined by a comparison of the resistance of said sensor to a function of said substantially constant parameter and the resistance of said resistor.

13. The temperature detection circuit as claimed in claim 11, wherein said IC chip further comprises:
a switching circuit coupled to said current mirror and operable for enabling and disabling current paths of said first and second currents.

14. The temperature detection circuit as claimed in claim 1, wherein said IC chip further comprises an analog to digital converter (ADC) operable for converting said sense voltage to a digital signal.

15. The temperature detection circuit as claimed in claim 1, wherein said sensor comprises a thermistor externally coupled to said IC chip.

16. A method comprising:
maintaining a current ratio of a first current flowing through a sensor to a second current flowing through a resistor to be equal to a substantially constant parameter of an integrated circuit (IC) chip, said resistor externally coupled to said IC chip;
comparing a sense voltage indicative of a temperature with a threshold voltage indicative of a temperature threshold; and
generating a temperature detection signal indicative of a condition of said temperature according to a result of said comparing.

17. The method as claimed in claim 16, further comprising:
using a voltage across said resistor as said threshold voltage; and
providing said sense voltage by said sensor.

18. The method as claimed in claim 17, wherein said temperature detection signal is determined by a comparison of the resistance of said sensor to a function of said substantially constant parameter and the resistance of said resistor.

19. The method as claimed in claim 16, further comprising:
generating a reference voltage by a reference voltage generator;
applying said reference voltage to generate said second current by said resistor;
mirroring said second current to generate said first current according to said substantially constant parameter; and
providing said sense voltage based on said first current by said sensor.

20. The method as claimed in claim 19, wherein said temperature detection signal is determined by a comparison of the resistance of said sensor to a function of said threshold voltage, said reference voltage, said substantially constant parameter, and the resistance of said resistor.

21. The method as claimed in claim 16, further comprising:
enabling and disabling current paths of said first and second currents.

22. The method as claimed in claim 16, further comprising:
converting said sense voltage to a digital signal.

23. The method as claimed in claim 16, further comprising:
generating said threshold voltage by a reference voltage generator;
applying said threshold voltage to generate said first current by said sensor;
mirroring said first current to generate said second current according to said substantially constant parameter; and
using a voltage across said resistor as said sense voltage.

24. The method as claimed in claim 23, wherein said temperature detection signal is determined by a comparison of the resistance of said sensor to a function of said substantially constant parameter and the resistance of said resistor.

25. An electronic system comprising:
a power source;
a load coupled to said power source and operable for receiving power from said power source; and
a temperature detection circuit coupled to said power source and operable for detecting a temperature of said power source, said temperature detection circuit including an IC chip and peripheral elements of said IC chip including a sensor and a resistor externally coupled to said IC chip, wherein said IC chip maintains a current ratio of a current flowing through said sensor to a current flowing through said resistor equal to a substantially constant parameter, and wherein the resistance of said sensor is equal to a function determined by the resistance of said resistor and said substantially constant parameter when said temperature of said power source reaches a temperature threshold.

26. The electronic system as claimed in claim 25, wherein said IC chip comprises a reference voltage generator operable for generating a reference voltage across said resistor and a threshold voltage indicative of said temperature threshold, wherein said function is further determined by said reference voltage and said threshold voltage.

27. The, electronic system as claimed in claim 25, wherein said temperature detection circuit is operable for providing a temperature detection signal indicative of a temperature condition selected from the group consisting of: a normal condition, an over-temperature condition, and an under-temperature condition.

28. The electronic system as claimed in claim 25, wherein said sensor comprises a thermistor externally coupled to said IC chip.

* * * * *